United States Patent [19]
Garito

[11] 3,873,822
[45] Mar. 25, 1975

[54] WATER-TIGHT ASSEMBLY FOR USE UNDER VERY HIGH PRESSURES
[75] Inventor: Humbert Garito, Marseille, France
[73] Assignees: Le Nickel; Centre National Pour L'Exploitation Des Oceans (CNEXO), both of Paris; ERJI, Marseille, all of, France
[22] Filed: Oct. 23, 1973
[21] Appl. No.: 408,484

[30] Foreign Application Priority Data
Oct. 25, 1972 France .............................. 72.37748

[52] U.S. Cl. ................................... 240/26, 116/27
[51] Int. Cl. ........................................... F21v 31/02
[58] Field of Search .............. 240/26, 6.4 F; 116/27

[56] References Cited
UNITED STATES PATENTS
1,611,651  12/1926  Leavitt ................................. 240/26
2,097,357  10/1937  Watts ................................... 240/26
2,272,802   2/1942  High et al. ............................ 240/26

Primary Examiner—Robert P. Greiner
Attorney, Agent, or Firm—Fleit & Jacobson

[57] ABSTRACT

A water-tight assembly of a lamp-glass and a tubular body for use under very high pressures, such as the kind used in underwater exploration devices, in which the lamp-glass is made of translucent plastic material and is characterized by a connecting end that is formed with an outer tapered surface and an inner planar face. The tubular body is metallic and has a connecting end formed with a tapered surface which is of a shape complementary to that of the lamp-glass with the two tapered surfaces in contact with each other. A toroidal seal is located in an annular groove formed in either one or both of the tapered surfaces. An intermediate semi-rigid member is shaped to have an annular shoulder and is screwed axially into the lamp-glass and into the tubular body. A resilient shock-absorbing washer is positioned between the inner face of the lamp-glass and the annular shoulder of the intermediate member.

7 Claims, 1 Drawing Figure

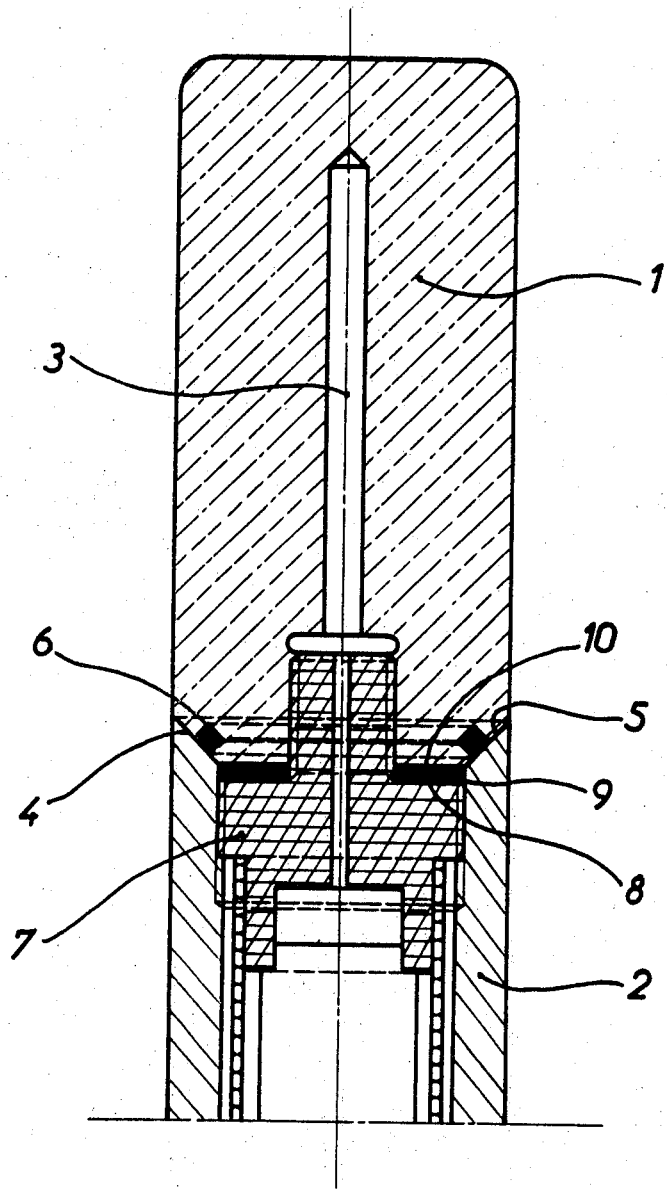

WATER-TIGHT ASSEMBLY FOR USE UNDER VERY HIGH PRESSURES

This invention relates to a water-tight mechanical assembly for use at very high pressures, and particularly of the kind used in underwater exploration devices. An assembly of this kind may interconnect a cylindrical body of metal and a lamp-glass made of a polymethyl metacrylate such as that sold under the Trade Mark PLEXIGLASS.

The assembly in accordance with the invention is particularly intended for use in submersible light generators. It is known that, for the purpose of exploring the ocean bed, use is made of various submersible devices including automatic apparatus for taking photographs and sampling instruments. These devices may be of the free-fall type, being attached to a detachable sinker and to floats, and are launched, unconnected, at the surface of the water. When a device of this type reaches the seabed, it is automatically disconnected from the sinker by means which will not be described here since they do not form part of the invention. Due to the action of the floats, the device then rises to the surface of the water where it can be recovered. Since such recovery is generally effected by a ship which is often that from which the exploration device was launched and which, at the moment when the device surfaces, is often at a considerable distance, the exploration device should be fitted with means for detecting it from a distance.

Detecting means for the above exploration devices are of several types including smoke-producing devices, radio-electric buoys, and flashing-light generators. The water-tight assembly of the invention is particularly intended for use in marking means of the last-mentioned kind.

A flashing light generator of this kind generally comprises a tubular metal body which contains electric batteries and the electronic circuits which charge an electric condenser at predetermined intervals. Screwed on to this tubular body is a lamp-glass, i.e., a cylinder made of a transparent material which is usually the PLEXIGLASS mentioned above. Extending into this lamp-glass from the tubular body is a lamp which constitutes the light-generating element and which is connected to the condenser. In known marking means in this art, sealing between the tubular body and the lamp-glass has been achieved by means of a toroidal sealing element fitted in an annular groove formed in the inner face of the body.

The known devices described above generally suffer from the inherent disadvantage of being unable to withstand the considerable hydrostatic pressures which are encountered when underwater explorations are carried out at depths which may be as much as 6,000 metres.

The aforementioned PLEXIGLASS is, in fact, a material having a mechanical strength lower than that of metal, since its tensile strength is of the order of 6 kg/mm$^2$ and its compressive strength is approximately 10 kg/mm$^2$. It is particularly this latter value which explains the appearance in the material of the lamp-glass of cleavage lines during tests at very high pressures. In longitudinal section, these lines are seen in PLEXIGLASS at points opposite the inner face of the metallic body and they open out towards the free end of the lamp-glass. Consequently, the lamp-glass tends to shear under pressure along these lines, and this tendency can be extremely troublesome since it leads to the fracture of the lamp-glass.

Furthermore, PLEXIGLASS suffers from the disadvantage of having poor resistance to impact, particularly when the material has been machined, and therefore contains starting points for fractures, for example in the screw-threads, shoulders and grooves which have to be provided. Thus, there arises a considerable risk of breakage due to the impacts which inevitably occur during underwater exploration programmes.

One of the objects of the present invention is, therefore, to provide a water-tight assembly of a PLEXIGLASS or like lamp-glass and a tubular metal body, that is able to resist a pressure of at least 600 bars.

A further object of the invention is to provide such an assembly which is capable of absorbing impacts occuring during operation.

Yet another object is to provide an assembly of this kind which is well suited for use in luminous apparatus for marking the positions of free-fall underwater exploration devices.

According to the invention there is provided a water-tight assembly of a lamp-glass and a tubular body, for use under very high pressures, the assembly comprising a lamp-glass of translucent plastics material having a connecting end formed with an outer tapered surface and an inner planar face, a tubular metal body having a connecting end formed with a tapered surface which is of a shape complementary to that of the lamp-glass and which in contact with the latter, a toroidal seal in an annular groove formed in at least one of the tapered surfaces, an intermediate semi-rigid member formed with two parts of different diameter which thus provides an annular shoulder, the intermediate member being screwed axially into the lamp-glass by one of its parts and into the tubular body by the other of its parts, and a resilient shock-absorbing washer between said inner planar face of the lamp-glass and said shoulder on the intermediate member.

Suitably, said intermediate member is axially symmetrical and said shoulder is planar and perpendicular to the axis of symmetry of the member. The annular groove in which the toroidal seal is fitted is preferably formed in the lamp-glass. Also, the tapered surfaces of the tubular body and the lamp-glass preferably slope outwardly towards the lamp-glass.

Preferably, the semi-rigid intermediate member is made of a synthetic material such as that marketed under the Trade Mark ERTALON.

When the water-tight assembly of the invention is used for flashing light generators, the intermediate member has an axial bore, and the lamp-glass has a blind opening which extends from the connecting end of the lamp-glass to accommodate a lamp element which generates a flashing light.

An embodiment of the present invention will now be described, by way of example, with reference to the accompanying drawing which shows a fragmentary section through a water-tight assembly in accordance with the invention.

Referring to the drawing, the assembly comprises a lamp-glass 1 made of a polymethyl metacrylate, such as that known under the Trade Mark PLEXIGLASS, fitted into a tubular metallic body 2. Where this assembly constitutes part of an illuminated apparatus for marking the positions of underwater exploration devices, the body 2 may be made of an aluminium alloy resistant to seawater corrosion, e.g. a suitable aluminium-magnesium alloy. Also in this case, the body 2 accommodates one or more electric batteries connected to an electronic circuit which charges an electric condenser at predetermined intervals. This condenser is in turn connected to a flashing lamp which is mounted on the body 2 and which, after the lamp-glass 1 has been fitted, has an element extending into opening 3 which is closed at one end and extends axially through a substantial part of the length of the lamp-glass 1. The electric circuit of the flashing lamp also includes an automatic switch which permits the lamp to function only after the device has risen again to the surface of the water. These electrical parts are not illustrated and will not be described in any detail as they are not features of the present invention.

To enable the description to be more readily understood, the water-tight assembly will be assumed to be positioned as illustrated in the drawing, that is to say with the lamp-glass 1 at the top, and expressions such as "upper," "lower" etc., are to be taken in this context.

According to the invention, the tubular body 2 terminates at the top in a tapered surface 4 which slopes outwardly and upwardly. The lamp-glass 1, on the other hand, has at its base a tapered contact surface 5 which slopes outwardly and upwardly and which is complementary to the shape of the tapered surface 4 with which it is in contact after the parts have been assembled. The tapered surface 5 of the lamp-glass 1 contains an annular groove 6 which accommodates a toroidal seal.

The lamp-glass and the body are fitted together by means of an intermediate member 7 which is screwed into the tubular body 2. This intermediate member 7 has a shoulder 8 and an upwardly extending cylindrical part of smaller diameter which is screwed into the lamp-glass 1. The member 7 has an axial bore to enable the flashing lamp to pass through to the blind opening 3. Before the parts are fitted together, a resilient washer 9 is placed between the shoulder 8 on the member 7 and lower planar face 10 of the lamp-glass 1 which lies inside the tapered surface 5.

The intermediate member 7 is preferably made of a semi-rigid synthetic material, such as that known under the Trade Mark ERTALON. This material absorbs impacts occuring in the zones where the parts are fitted together because of its own inherent resilience and also as a result of the presence of the resilient washer 9 which performs the function of a shock-absorber.

Without wishing to be limited to any theory which explains the efficiency of the assembly according to the invention, it might be stated that it is probably the conical nesting of the tapered surface 5 of the lamp-glass 1 in the corresponding surface 4 of the tubular body 2 which prevents the cleavage phenomenon otherwise observed in lamp-glasses under high pressures. This undesirable phenomenon is probably eliminated by the increased contact surface between the two parts fitted together, and the conical nesting arrangement probably compresses the material of the lamp-glass 1 towards the centre and thereby suppresses the tendency to fracture along the orthogonal cleavage plane.

The toroidal seal 6 also increases the degree of watertightness and prevents ingress of water between the contact surfaces 4 and 5.

However, regardless of the exact theoretical explanation, it has been found in tank tests carried out on a device of 45 mm diameter and comprising a lamp-glass and a tubular body, that the assembly according to the invention withstands a pressure of 600 bars, which corresponds to a depth of immersion of around 6,000 metres.

What we claim is:

1. A water-tight assembly of a lamp-glass and a tubular body, for use under very high pressures, the assembly comprising a lamp-glass of translucent plastics material having a connecting end formed with an outer tapered surface and an inner planar face, a tubular metal body having a connecting end formed with a tapered surface which is of a shape complementary to that of the lamp-glass and which in contact with the latter, a toroidal seal in an annular groove formed in at least one of the tapered surfaces, an intermediate semi-rigid member formed with two parts of different diameter which thus provides an annular shoulder, the intermediate member being screwed axially into the lamp-glass by one of its parts and into the tubular body by the other of its parts, and a resilient shock-absorbing washer between said inner planar face of the lamp-glass and said shoulder on the intermediate member.

2. An assembly according to claim 1, in which said intermediate member is screwed into the tubular body by that of its parts which is of greater diameter.

3. An assembly according to claim 2, in which the annular shoulder on said intermediate member is planar and perpendicular to the axial length of said member.

4. An assembly according to claim 3, in which said annular groove is formed in the tapered surface of the lamp-glass.

5. An assembly according to claim 4, in which said tapered surfaces slope outwardly towards the lamp-glass.

6. An assembly according to claim 5, in which said intermediate member is formed of a plastics material such as ERTALON.

7. An assembly according to claim 6, in which said lamp-glass has an opening closed at its outer end and said intermediate member has an axial bore to enable a flashing lamp to be passed therethrough.

* * * * *